United States Patent
Krøll Jensen et al.

(10) Patent No.: US 10,941,038 B2
(45) Date of Patent: Mar. 9, 2021

(54) ATR BASED AMMONIA PROCESS AND PLANT

(71) Applicant: HALDOR TOPSØE A/S, Kgs. Lyngby (DK)

(72) Inventors: Annette E. Krøll Jensen, Fredensborg (DK); Per Juul Dahl, Vedbæk (DK); Niels Christian Schjødt, Brønshøj (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 16/074,515

(22) PCT Filed: Feb. 2, 2017

(86) PCT No.: PCT/EP2017/052247
§ 371 (c)(1),
(2) Date: Aug. 1, 2018

(87) PCT Pub. No.: WO2017/134162
PCT Pub. Date: Aug. 10, 2017

(65) Prior Publication Data
US 2019/0039886 A1    Feb. 7, 2019

(30) Foreign Application Priority Data
Feb. 2, 2016  (DK) .............. PA 2016 70056

(51) Int. Cl.
*C01B 3/02* (2006.01)
*C01B 3/48* (2006.01)
(Continued)

(52) U.S. Cl.
CPC .............. *C01B 3/025* (2013.01); *B01J 21/04* (2013.01); *B01J 23/005* (2013.01); *B01J 23/06* (2013.01);
(Continued)

(58) Field of Classification Search
CPC ....................................... C01B 3/025
See application file for complete search history.

(56) References Cited

U.S. PATENT DOCUMENTS 3,382,045 A    5/1968  Habermehl et al.
4,367,206 A *  1/1983  Pinto ................ C01C 1/0488
                                            423/359
(Continued)

FOREIGN PATENT DOCUMENTS

CN    1043291 A    6/1990
CN    102083745 A  6/2011
(Continued)

OTHER PUBLICATIONS

International Search Report (PCT/ISA/210) dated Mar. 24, 2017, by the European Patent Office as the International Searching Authority for International Application No. PCT/EP2017/052247.
(Continued)

*Primary Examiner* — Douglas B Call
(74) *Attorney, Agent, or Firm* — Buchanan Ingersoll & Rooney P.C.

(57) ABSTRACT

A process for producing an ammonia synthesis gas, said process including the steps of: reforming a hydrocarbon feed in a reforming step thereby obtaining a synthesis gas comprising $CH_4$, $CO$, $CO_2$, $H_2$ and $H_2O$; and shifting said synthesis gas in a high temperature shift step over a promoted zinc-aluminum oxide based high temperature shift catalyst, wherein the steam/carbon ratio in the reforming step is less than 2.6.

15 Claims, 2 Drawing Sheets

(51) Int. Cl.
*C01C 1/04* (2006.01)
*B01J 23/06* (2006.01)
*C01B 3/38* (2006.01)
*B01J 21/04* (2006.01)
*B01J 23/00* (2006.01)
*B01J 23/78* (2006.01)

(52) U.S. Cl.
CPC ............... *B01J 23/78* (2013.01); *C01B 3/382* (2013.01); *C01B 3/48* (2013.01); *C01C 1/04* (2013.01); *C01C 1/0405* (2013.01); *C01B 2203/0244* (2013.01); *C01B 2203/0288* (2013.01); *C01B 2203/042* (2013.01); *C01B 2203/046* (2013.01); *C01B 2203/048* (2013.01); *C01B 2203/0415* (2013.01); *C01B 2203/0475* (2013.01); *C01B 2203/0495* (2013.01); *C01B 2203/068* (2013.01); *C01B 2203/1076* (2013.01); *C01B 2203/142* (2013.01); *Y02P 20/52* (2015.11)

(56) References Cited

U.S. PATENT DOCUMENTS

| | | | |
|---|---|---|---|
| 5,180,570 A | | 1/1993 | Lee et al. |
| 7,998,897 B2 | | 8/2011 | Schioedt |
| 2002/0141938 A1 | * | 10/2002 | Ruettinger ............... B01J 23/56 423/652 |
| 2004/0028595 A1 | * | 2/2004 | Davey ..................... C01B 3/025 423/361 |
| 2004/0105804 A1 | | 6/2004 | Lee et al. |
| 2011/0101279 A1 | * | 5/2011 | Schiodt ..................... C01B 3/16 252/373 |
| 2011/0229405 A1 | | 9/2011 | Guo et al. |
| 2011/0297886 A1 | | 12/2011 | Panza |
| 2013/0101490 A1 | * | 4/2013 | Filippi ..................... C01B 3/025 423/359 |
| 2014/0291581 A1 | | 10/2014 | Iaquaniello et al. |
| 2015/0044120 A1 | | 2/2015 | Singh et al. |
| 2015/0203359 A1 | * | 7/2015 | Nataraj ................. C01C 1/0405 423/359 |
| 2016/0115017 A1 | | 4/2016 | Ostuni et al. |

FOREIGN PATENT DOCUMENTS

| | | |
|---|---|---|
| CN | 105189340 A | 12/2015 |
| DE | 4334257 A1 | 4/1995 |
| DK | 4334257 A1 | 4/1995 |
| EA | 201791755 A1 | 12/2017 |
| EP | 0522744 A2 | 1/1993 |
| EP | 2631213 A1 | 8/2013 |
| FR | 2567866 A1 | 1/1986 |
| WO | 9006281 A1 | 6/1990 |
| WO | 2010000387 A1 | 1/2010 |
| WO | 2011021025 A1 | 2/2011 |
| WO | 2013095130 A1 | 6/2013 |
| WO | 2014056535 A1 | 4/2014 |
| WO | 2016124886 A1 | 8/2016 |

OTHER PUBLICATIONS

Written Opinion (PCT/ISA/237) dated Mar. 24, 2017, by the European Patent Office as the International Searching Authority for International Application No. PCT/EP2017/052247.
Danish Search Report dated Jun. 1, 2016.
Office Action dated Feb. 2, 2018, by the Eurasian Patent Office in corresponding Eurasian Patent Application No. 201891734,/28, (8 pages).
Office Action dated Aug. 31, 2020, by the Tai E International Patent & Law Office in corresponding Application No. 10920734020. and an English Translation of the Office Action. (22 pages).
Search Report dated Sep. 4, 2020 by the African Regional Intellectual Property Organization (ARIPO) in corresponding Application No. AP/P/2018/010942, 4 pages.
Office Action dated Oct. 7, 2020, by the Intellectual Property Office of Uzbek in corresponding Uzbek Patent Application No. IAP 2018 0411, and Agents Report, (5 pages).

* cited by examiner

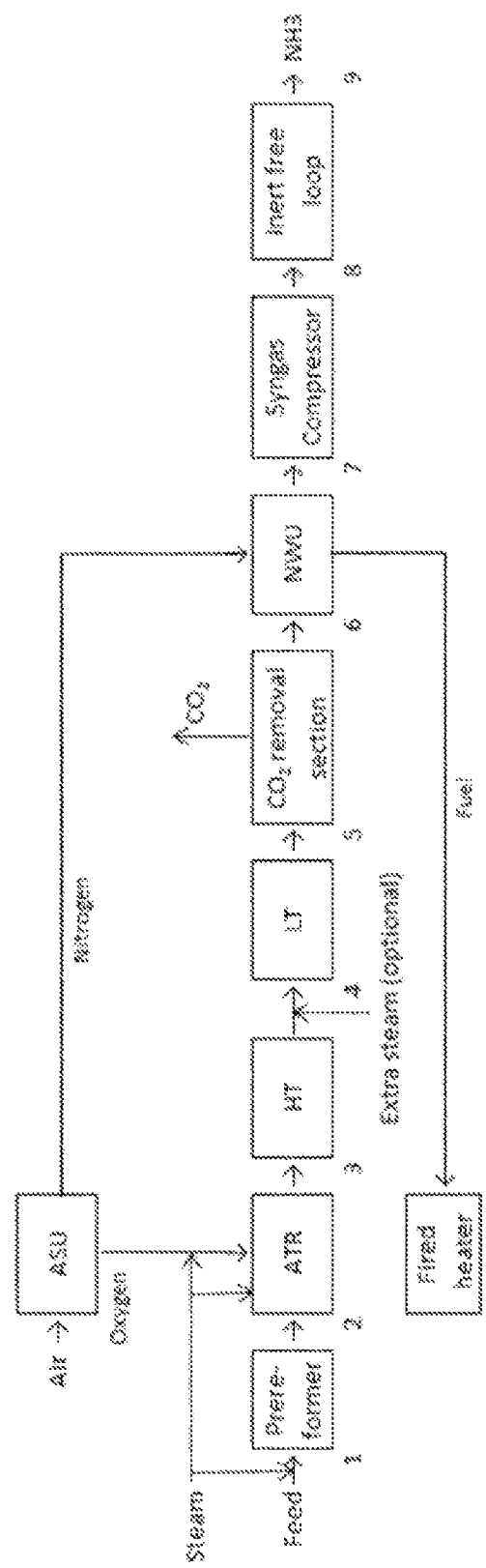
Figure 1 Example

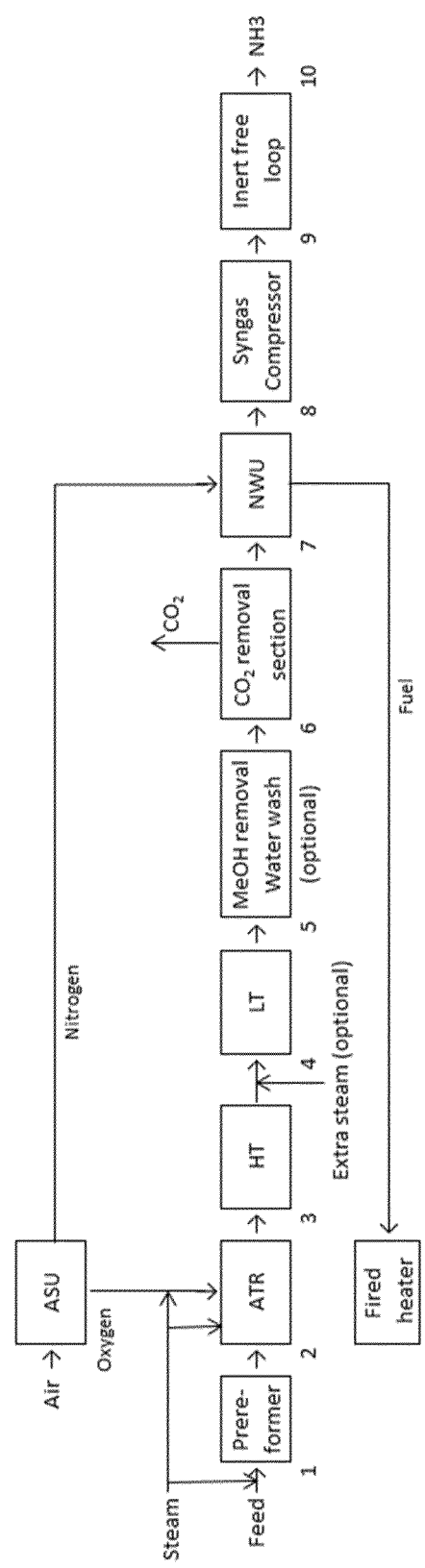
Figure 2 Process scheme including MeOH removal

ATR BASED AMMONIA PROCESS AND PLANT

BACKGROUND

Following today's demand and competitiveness in ammonia production, significant efforts have been put into developing optimized production for ammonia plants, with the objective to improve overall energy efficiency and reduce capital cost. The need for more cost-efficient ammonia production has spurred the development of technology and catalysts for large-scale ammonia production units, in order to benefit from economy of scale.

SUMMARY

Topsøe's latest innovations within ammonia production technology and the development of a new generation of state-of-the-art catalysts ensures highly cost efficient ammonia production and high plant reliability also for single line capacities of 5000 MTPD ammonia or more where todays standard is up to only 3300 MTPD.

BRIEF DESCRIPTION OF THE DRAWINGS

FIG. 1 shows an exemplary process scheme.
FIG. 2 shows an exemplary process scheme.

DETAILED DESCRIPTION

In a first aspect of the present invention is provided a process enabling a process scheme utilizing proven reforming technology operating with low steam/carbon.

In a second aspect of the present invention is provided a process enabling operation of the high temperature (HT) shift downstream the reforming section at the same low steam/carbon ratio as the reforming section.

In a third aspect of the present invention is provided a process scheme without the necessity of a methanation section to remove residual carbon components in the make-up synthesis gas for an ammonia synthesis.

In a fourth aspect of the present invention is provided an overall process layout enabling maximum single line capacity.

These and further advantages are achieved by a process for producing an ammonia synthesis gas, said process comprising the steps of:
Reforming a hydrocarbon feed in a reforming step thereby obtaining a synthesis gas comprising $CH_4$, $CO$, $CO_2$, $H_2$ and $H_2O$
Shifting said synthesis gas in a high temperature shift step over a promoted zinc-aluminum oxide based HT shift catalyst, wherein
The steam/carbon in the reforming step is less than 2.6.
HT shift is defined as a process step where a synthesis gas containing $CO$, $CO_2$, $H_2$ and $H_2O$ undergoes the shift reaction in the temperature range from 300° C. to 600° C.

In a conventional ammonia plant the standard use of an iron based HT shift catalyst requires a steam/carbon ratio of around 3.0 to avoid iron carbide formation.

$$5Fe_3O_4 + 32CO \leftrightarrow 3Fe_5C_2 + 26CO_2 \tag{1}$$

Formation of iron carbide will weaken the catalyst pellets and may result in catalyst disintegration and pressure drop increase.

Iron carbide will catalyse Fischer-Tropsch by-product formation $$nCO + (n+m/2)H_2 \leftrightarrow C_nH_m + nH_2O \tag{2}$$

The Fischer-Tropsch reactions consume hydrogen, whereby the efficiency of the shift section is reduced.

However, according to the present invention a non Fe-catalyst is used, such as a promoted zinc-aluminum oxide based catalyst. For example, the Topsøe SK-501 Flex™ HT shift catalyst which enables operation of the reforming section and HT shift section at a steam/carbon ratio down to 0.3.

Thus, the present process operating at a steam/carbon ratio down to 0.3 is in contrast to today's traditional ammonia plants which are based on reforming and/or HT shift sections operating at a steam/carbon ratio of 2.6 or higher. In advantageous embodiments of the process the zinc-aluminum oxide based catalyst in its active form comprises a mixture of zinc aluminum spinel and zinc oxide in combination with an alkali metal selected from the group consisting of Na, K, Rb, Cs and mixtures thereof, and optionally in combination with Cu. The catalyst may have a Zn/Al molar ratio in the range 0.5 to 1.0, a content of alkali metal in the range 0.4 to 8.0 wt % and a copper content in the range 0-10% based on the weight of oxidized catalyst.

The HT shift catalyst used according to the present process is not limited by strict requirements to steam to carbon ratios, which makes it possible to reduce the steam/carbon ratio in the shift section as well as the reforming section.

A steam/carbon ratio of less than 2.6 has several advantages. Reducing the steam/carbon ratio on a general basis leads to reduced feed plus steam flow through the reforming section and the downstream cooling and synthesis gas preparation sections.

A low steam/carbon ratio in the reforming section and the shift section enables higher syngas throughput compared to a high steam/carbon ratio. Nitrogen added via the Nitrogen wash enables higher syngas throughput compared to adding nitrogen in the reforming section. The absence of a methanation section reduces pressure loss and using an inert free gas in the ammonia synthesis section enables higher throughput in the ammonia synthesis section Reduced mass flow through these sections means smaller equipment and piping sizes. The reduced mass flow also results in reduced production of low temperature calories, which can often not be utilised. This means that there is a potential for both lower CAPEX and OPEX.

The present process may further comprise one or more of the following steps:
Shifting the HT shift outlet gas in one or more medium temperature (MT)/low temperature (LT) shift step(s). The MT/LT shift step(s) can optionally be performed at a higher steam/carbon ratio than the HT shift to limit byproduct formation such as methanol.
Optionally remove methanol from the MT/LT shift outlet gas in a water wash
Remove $CO_2$ from the MT/LT shift outlet gas/water wash outlet gas down to a level lower than 500 ppm preferably down to below 20 ppm.
Remove residual $CO_2$ and $H_2O$ from the gas leaving the $CO_2$ removal section in a molecular sieve dryer section.
Remove $CH_4$, $CO$ and inerts such as Ar and He from the gas leaving the molecular sieve dryer section in a nitrogen wash section and adjust the $N_2/H_2$ ratio to approximate 3 as needed for the ammonia synthesis.
Convert the adjusted outlet gas from the nitrogen wash to ammonia in an inert free ammonia synthesis section.

In preferred embodiments the reforming step comprises at least an autothermal reformer (ATR).

As the requirements to the steam/carbon ratio in the HT shift step by the present process is significantly reduced compared to known technologies it is possible by the present invention to reduce the steam/carbon ratio through the front end to, e.g., 0.6 or as low as possible dependent on the possible shift solutions. An advantage of a low steam/carbon ratio to the ATR and in the overall process is that smaller equipment is required in the front-end due to the lower total mass flow through the plant.

The carbon feed for the ATR is mixed with oxygen and additional steam in the ATR, and a combination of at least two types of reactions takes place. These two reactions are combustion and steam reforming.

Combustion Zone:

$$2H_2+O_2 \leftrightarrow 2H_2O+\text{heat} \tag{3}$$

$$CH_4+3/2O_2 \leftrightarrow CO+2H_2O+\text{heat} \tag{4}$$

Thermal and Catalytic Zone:

$$CH_4+H_2O+\text{heat} \leftrightarrow CO+3H_2 \tag{5}$$

$$CO+H_2O \leftrightarrow CO_2+H_2+\text{heat} \tag{6}$$

The combustion of methane to carbon monoxide and water (4) is a highly exothermic process. Excess methane may be present at the combustion zone exit after all oxygen has been converted.

The thermal zone is part of the combustion chamber where further conversion of the hydrocarbons proceed by homogenous gas phase reactions, mostly (5) and (6). The endothermic steam reforming of methane (5) consumes a large part of the heat developed in the combustion zone.

Following the combustion chamber there may be a fixed catalyst bed, the catalytic zone, in which the final hydrocarbon conversion takes place through heterogeneous catalytic reactions. At the exit of the catalytic zone, the synthesis gas preferably is close to equilibrium with respect to reactions (5) and (6).

The steam/carbon ratio in the reforming section may be 2.6-0.1, 2.4-0.1, 2-0.2, 1.5-0.3, 1.4-0.4, such as 1.2, 1.0 or 0.6.

The steam/carbon ratio is defined as the ratio of all steam added to the reforming section upstream of the HT shift section (i.e. steam which may have been added to the reforming section via the feedgas, oxygen feed, by addition to burners etc.) and the hydrocarbons in the feedgas to the reforming section on a molar basis.

Thus, according to the present invention it is possible to run the process with no additional steam addition between the reforming step(s) and the high temperature shift step.

In advantageous embodiments, the space velocity in the ATR is low, such as less than 20,000 $Nm^3$ $C/m^3/h$, preferably less than 12,000 $Nm^3$ $C/m^3/h$ and most preferably less 7000 $Nm^3$ $C/m^3/h$. The space velocity can be defined as the volumetric carbon flow per catalyst volume and is thus independent of the conversion in the catalyst zone.

In preferred embodiments, the temperature in the HT shift step is in the range 300-600° C., such as 360-470° C. This means that, according to the present process, it is possible to run a high temperature shift reaction on a feed with a much lower steam/carbon ratio than is possible by known processes. For example, the high temperature shift inlet temperature may be 300-400° C., such as 350-380° C.

Preferably, a prereformer is provided as part of the reforming section upstream for example an ATR. In the prereformer all higher hydrocarbons can be converted to carbon oxides and methane, but also for light hydrocarbons the prereformer is advantageous. Providing the prereformer may have several advantages including reducing the required $O_2$ consumption in the ATR and allowing higher inlet temperatures to the ATR since cracking risk by preheating is minimized. Thereby the ignition conditions are reached. Furthermore, the prereformer may provide an efficient sulphur guard resulting in a practically sulphur free feed gas entering the ATR and the downstream system. The prereforming step may be carried out at temperatures between 300-650° C., preferably 390-480° C.

In various embodiments a fired heater is used for preheating the natural gas feed, the prereformer and ATR feed and for steam superheating. The necessary heat may be generated by burning a mixture of natural gas, waste gas (from the $N_2$ wash), off gas (from the inert vent gas separator) and flash gas (from the $CO_2$ removal section).

The low steam/carbon ratio may result in a lower than optimal shift conversion which means that it in some embodiments may be advantageous to provide one or more additional shift steps. The one or more additional shift steps may include a MT shift and/or a LT shift and/or a HT shift. Generally speaking, the more converted CO in the shift steps the more gained $H_2$ and the smaller front end required.

This is also seen from the exothermic shift reaction given below $$CO+H_2O \leftrightarrow CO_2+H_2+\text{heat} \tag{7}$$

Steam may optionally be added after the HT shift step such as before one or more following MT or LT shift and/or HT shift steps in order to maximize performance of said following HT, MT and/or LT shift steps.

Having two or more HT shift steps in series (such as a HT shift step comprising two or more shift reactors in series e.g. with the possibility for cooling and/or steam addition in between) may be advantageous as it may provide increased shift conversion at high temperature which gives a possible reduction in required shift catalyst volume and therefore a possible reduction in capex. Furthermore, high temperature reduces the formation of methanol, a typical shift step byproduct.

Preferably, the MT and LT shift steps may be carried out over promoted copper/zink/aluminia catalysts. For example the low temperature shift catalyst type may be LK-821-2, which is characterized by high activity, high strength, and high tolerance towards sulphur poisoning. A top layer of a special catalyst may be installed to catch possible chlorine in the gas and to prevent liquid droplets from reaching the shift catalyst.

The MT shift step may be carried out at temperatures at 190-360° C.

The LT shift step may be carried out at temperatures at $T_{dew}$+15-290° C., such as, 200-280° C. For example the low temperature shift inlet temperature is from $T_{dew}$+15-250° C., such as 190-210° C.

Reducing the steam/carbon ratio leads to reduced dew point of the process gas, which means that the inlet temperature to the MT and/or LT shift steps can be lowered. A lower inlet temperature can mean lower CO slippage from the outlet of the shift reactors.

It is well known that MT/LT shift catalysts are prone to produce methanol as a byproduct. Such byproduct formation can be reduced by increasing the steam/carbon ratio. The $CO_2$ wash following the MT/LT shifts requires heat for regeneration of the $CO_2$ absorption solution. This heat is normally provided as sensible heat from the process gas but this is not always enough. Typically an addition steam fired reboiler provides the missing heat. Optionally adding steam to the process gas can replace this additional steam fired reboiler and simultaneously ensures reduction of byproduct formation in the MT/LT shifts section.

The methanol formed by the MT/LT shift catalyst can optionally be removed from the synthesis gas in a water wash to be placed upstream of the $CO_2$ removal step or on the $CO_2$ product stream.

In many advantageous embodiments a $CO_2$ removal step may be carried out after/downstream the one or more shift steps. In standard design the $CO_2$ content is 500 vppm in the treated gas.

In preferred embodiments a $CO_2$ removal step may be used to bring the $CO_2$ content down to less than 400 vppm $CO_2$, such as below 100 vppm or in some preferred embodiments down to 20 vppm or below.

The process may further comprise a washing step, preferably a $N_2$ wash. The $N_2$ wash may serve several purposes, such as purification of the syngas, as well as to add the stoichiometric required nitrogen for a downstream ammonia synthesis.

The nitrogen for the $N_2$ wash unit (NWU) may be supplied by an air separation unit (ASU) which separates atmospheric air into its primary components nitrogen and oxygen. The oxygen is used in the ATR and the nitrogen in the NWU.

least two vessels one in operation while the other is being regenerated. Nitrogen may be used as dry gas for regeneration.

In the NWU the syngas is washed by liquid nitrogen in a column where $CH_4$, Ar, He and CO are removed. The purified syngas preferably contains only ppm levels of Ar and $CH_4$.

The waste gas containing the impurities together with some lost nitrogen may advantageously be used as fuel in the fired heater.

After the NWU, nitrogen gas may be added to the process stream in order to adjust the $N_2$ content to a preferred ratio $H_2/N_2$ ratio of 3 in the make-up stream to the ammonia synthesis loop.

Because the purified syngas now only contains $H_2$ and $N_2$ in the correct stoichiometric ratio for ammonia synthesis, plus ppm levels of Ar and $CH_4$, the ammonia synthesis section can be considered inert free.

An ammonia synthesis loop is defined as inert free when it is not required to purge gas from the loop because the build-up of inerts is negligible without such purge.

Example

The below positions refer to the inlet of the units.

TABLE 1

| | \multicolumn{8}{c}{Flows and operating conditions} |
|---|---|---|---|---|---|---|---|---|
| | \multicolumn{8}{c}{Position} |
| | Pos. 1 | Pos. 2 | Pos. 3 | Pos. 4 | Pos. 5 | Pos. 6 | Pos. 7/8 | Pos. 9 |
| Temperature, ° C. | 450 | 650 | 360 | 205 | 75 | 20 | 15 | −32 |
| Pressure, kg/cm² g | 41.3 | 39.3 | 35.7 | 34.8 | 33.3 | 32.4 | 31.4/186 | 5.0 |
| Flow, Nm³/h | 187,432 | 198,532 | 391,946 | 391,946 | 391,946 | 270,351 | 334,226 | 164,416 |

Main Components

TABLE 2

| | \multicolumn{8}{c}{Stream compositions, Positions refer to FIG. 1} |
|---|---|---|---|---|---|---|---|---|
| Composition, Mole % | Pos. 1 | Pos. 2 | Pos. 3 | Pos. 4 | Pos. 5 | Pos. 6 | Pos. 7/8 | Pos. 9 |
| Ar | | | 0.07 | 0.07 | 0.07 | 0.10 | | |
| $C_{3+}$ | 2.23 | | | | | | | |
| $C_2H_6$ | 2.58 | | | | | | | |
| $CH_4$ | 40.02 | 47.47 | 0.95 | 0.95 | 0.95 | 1.37 | | |
| CO | 0.38 | 0.09 | 20.08 | 10.07 | 3.49 | 5.04 | | |
| $CO_2$ | 2.58 | 5.50 | 5.85 | 15.86 | 22.44 | 20 ppm | | |
| $H_2$ | 1.49 | 4.93 | 47.81 | 57.82 | 64.40 | 92.96 | 75.00 | |
| $N_2$ | 0.66 | 0.63 | 0.32 | 0.32 | 0.32 | 0.46 | 25.00 | |
| $NH_3$ | | | | | | | | 100.00 |
| $H_2O$ | 50.04 | 41.38 | 24.93 | 14.92 | 8.34 | 0.07 | | |

After the one or more shift sections and $CO_2$ removal unit, the gas may contain residual CO and $CO_2$ together with small amounts of $CH_4$, Ar, He and $H_2O$.

$CO_2$ and $H_2O$ are preferably removed before the $N_2$ wash because they otherwise would freeze at the low operating temperature of the $N_2$ wash. This may, for example, be done by adsorption in a molecular sieve dryer consisting of at Prereformer: Tin/Tout: 450/449° C. (ΔT=−1° C.)
Steam/carbon ratio, S/C=0.9 inlet of the prereformer
ATR:
The process gas enters the ATR at 650° C. and the temperature of the oxygen is around 260° C.
Steam/carbon ratio, S/C=1.0 as per definition in the description The process gas leaves the reforming section at about 1025° C. through a refractory lined outlet section and transfer line to the waste heat boilers in the process gas cooling section.

Shift Section:
HT: Tin/Tout: 360/469° C. (ΔT=109° C.)
LT: Tin/Tout: 205/280° C. (ΔT=75° C.)

After reforming, about 26.7 vol % CO is present in the gas (dry basis). In the high temperature CO converter the CO content is reduced to approximately 11.8 vol %, and the temperature increases from 360° C. to 469° C. The heat content of the effluent from the high temperature CO converter is recovered in a waste heat boiler and in a boiler feed water preheater.

The process gas is thereby cooled to 205° C. and passed on to the low temperature CO converter in which the CO content is reduced to approximately 3.8 vol %, while the temperature increases to 280° C.

$CO_2$ Removal Section

The $CO_2$ content in the outlet stream from shift section is reduced to 20 ppm. All Methanol in the synthesis gas going to the $CO_2$ removal section will leave this section with the process condensate and the $CO_2$ product stream. A water wash on the synthesis gas going to the $CO_2$ removal section, see FIG. 2, or on the $CO_2$ product stream can minimize the Methanol content in the $CO_2$ product stream $N_2$ Wash Section The first step in this section is a quantitative removal of $CO_2$ and $H_2O$ in a molecular sieve dryer. The next step is a $N_2$ liquid wash removing components other than $H_2$ and $N_2$ down to ppm level. The third step is to adjust the $H_2/N_2$ ratio to approximate 3 using gaseous nitrogen.

Syngas Compressor:

The synthesis gas is compressed from 31.4 to 185.5 $kg/cm^2g$ in the centrifugal type two-casing synthesis gas compressor. Part of the last casing forms the recirculation compressor in the synthesis loop.

Inert free loop: The loop can be defined as inert when no purge gas system is required.

The small amounts of inert gases entering the loop with the make-up synthesis gas will accumulate in the loop until the amount of inert gases dissolved in the liquid ammonia exit the let-down vessel equals the amount entering the loop. Off gas from the let-down vessel is recycled back to the synthesis gas compressor.

The recycled inert level is dependent on the level of inerts dissolved in the liquid ammonia leaving the ammonia separator and the let-down vessel.

If required, the level of inert gas in the loop can be reduced by an intermittent purge of a small gas stream.

In this example the inert level in the purified gas leaving the $N_2$ wash is 17 ppm Ar, in the make-up gas 53 ppm Ar (after addition of the off gas recycle stream from the let-down vessel) and 0.30% Ar inlet the converter.

The invention claimed is:

1. A process for producing an ammonia synthesis gas, said process comprising the steps of:
    reforming a hydrocarbon feed mixed with oxygen in an autothermal reformer (ATR) thereby obtaining a synthesis gas comprising $CH_4$, CO, $CO_2$, $H_2$ and steam; and
    shifting said synthesis gas in at least one high temperature shift step over a promoted zinc-aluminum oxide based high temperature shift catalyst,
    wherein steam is present in the reforming step,
    wherein a steam/carbon ratio in the reforming step is 1.4-0.3, and
    wherein at least a required amount of nitrogen for a downstream ammonia synthesis is added into the synthesis gas in an $N_2$ wash step.

2. The process according to claim 1, wherein the temperature in the high temperature shift step is 300-600° C.

3. The process according to claim 1, wherein the promoted zinc-aluminum oxide based HT shift catalyst comprises in its active form a Zn/Al molar ratio in the range 0.5 to 1.0 and a content of alkali metal in the range 0.4 to 8.0 wt % and a copper content in the range 0-10% based on the weight of oxidized catalyst.

4. The process according to claim 1, wherein a space velocity in the ATR is less than 20,000 $Nm^3 C/m^3/h$.

5. The process according to claim 1, further comprising a prereforming step.

6. The process according to claim 1, wherein the at least one high temperature shift step is two or more high temperature shift steps in series.

7. The process according to claim 1, further comprising one or more additional shift steps downstream of the high temperature shift step.

8. The process according to claim 7, wherein the one or more additional shift steps are one or more medium temperature shift steps and/or one or more low temperature shift steps.

9. The process according to claim 7, wherein steam is added to the synthesis gas before the one or more additional shift steps downstream of the high temperature shift step.

10. The process according to claim 7, wherein the synthesis gas leaving the one or more additional shift steps downstream of the high temperature shift step is washed with water to reduce a content of methanol formed as a by-product during shifting the synthesis gas.

11. The process according to claim 1, further comprising a $CO_2$ removal step removing $CO_2$ from the synthesis gas down to a level less than 400 vppm $CO_2$.

12. The process according to claim 1, wherein there is no additional steam addition between the reforming step and the at least one high temperature shift step.

13. A process for producing ammonia, wherein an ammonia synthesis gas is achieved by the process according to claim 1.

14. A process for producing an ammonia synthesis gas, said process comprising the steps of:
    reforming a hydrocarbon feed mixed with oxygen in an autothermal reformer (ATR) thereby obtaining a synthesis gas comprising $CH_4$, CO, $CO_2$, $H_2$ and steam;
    shifting said synthesis gas in a high temperature shift step over a promoted zinc-aluminum oxide based high temperature shift catalyst; and
    conducting an $N_2$ wash of said synthesis gas, adding nitrogen to the washed synthesis gas such that, after addition of nitrogen, the synthesis gas contains hydrogen and nitrogen in a ratio $H_2/N_2$ of about 3;
    wherein steam is present in the reforming step; and
    wherein a steam/carbon ratio in the reforming step is 1.4-0.3.

15. The process according to claim 14, wherein there is no additional steam addition between the reforming step and the high temperature shift step.

* * * * *